United States Patent [19]
Bhargava et al.

[11] Patent Number: 5,813,032
[45] Date of Patent: Sep. 22, 1998

[54] SYSTEM AND METHOD FOR CONTINUOUS DESTAGING OF CHANGED DATA FROM A SHARED CACHE IN A MULTISYSTEM SHARED DISK ENVIRONMENT WHEREIN CASTOUT INTEREST IS ESTABLISHED IN A HIERARCHICAL FASHION

[75] Inventors: Gautam Bhargava, Cupertino; Inderpal Singh Narang, Saratoga; James Z. Teng, San Jose, all of Calif.

[73] Assignee: International Business Machines Corporation, Armonk, N.Y.

[21] Appl. No.: 827,422

[22] Filed: Mar. 27, 1997

Related U.S. Application Data

[63] Continuation of Ser. No. 311,755, Sep. 23, 1994, abandoned.

[51] Int. Cl.6 .................................................... G06F 12/02
[52] U.S. Cl. .......................... 711/130; 711/113; 711/145; 711/147; 395/200.43; 395/182.09; 395/182.11; 395/726
[58] Field of Search .......................... 495/182.02, 182.08, 495/182.04, 182.11, 457, 472, 474, 726, 732; 395/200.43; 711/113, 130, 145

[56] References Cited

U.S. PATENT DOCUMENTS

| | | | |
|---|---|---|---|
| 4,399,504 | 8/1983 | Obermarck et al. | 395/726 |
| 4,422,142 | 12/1983 | Inaba et al. | 395/308 |
| 4,610,013 | 9/1986 | Long et al. | 395/182.09 |
| 4,965,719 | 10/1990 | Shoens et al. | 711/100 |
| 5,129,089 | 7/1992 | Nielsen | 395/726 |
| 5,142,638 | 8/1992 | Schiffleger | 711/151 |
| 5,280,611 | 1/1994 | Mohan et al. | 707/8 |
| 5,287,473 | 2/1994 | Mohan et al. | 711/133 |
| 5,339,427 | 8/1994 | Elko et al. | 395/673 |
| 5,390,328 | 2/1995 | Frey et al. | 395/683 |
| 5,423,044 | 6/1995 | Sutton et al. | 395/726 |
| 5,459,862 | 10/1995 | Garliepp et al. | 707/8 |
| 5,488,716 | 1/1996 | Schneider et al. | 395/182.08 |
| 5,491,787 | 2/1996 | Hashemi | 395/182.09 |
| 5,493,668 | 2/1996 | Elko et al. | 311/130 |
| 5,537,574 | 7/1996 | Elko et al. | 311/141 |
| 5,630,050 | 5/1997 | Neuhard et al. | 395/183.03 |

OTHER PUBLICATIONS

C. Mohan and I. Narang, "Data Base Recovery in Shared Disks and Client–Server Architectures" Jun. 1992, Distributed Computing Systems, 1992 International Conference, pp. 310–317.

G. Bhargava and S. Gadia, "Relational Database Systems with Zero Information Loss", Feb. 1993, IEEE Transactions on Knowledge and Data Engineering, vol. 5, Issue 1, pp. 76–87.

IBM Technical Disclosure Bulletin, "Distributed Locking Facility for Multi–System Data Sharing", vol. 31, No. 1, Jun. 1988, pp. 206–211.

C.J. Date, "An Introduction to Database Systems vol. II", 1983, QA76.9.D3D 367, Addison–Wesley, pp. 291–340.

*Primary Examiner*—Eddie P. Chan
*Assistant Examiner*—Hong C. Kim
*Attorney, Agent, or Firm*—Marilyn Smith Dawkins; Sterne, Kessler, Goldstein & Fox, PLLC

[57] ABSTRACT

A system and method for destaging changed data from a shared cache castout in a shared data environment distributes castout ownership for a dataset among a plurality of systems having an update interest in the dataset. One system is designated as having castout ownership of the dataset in a primary state. All other systems having an update interest in the dataset hold castout ownership for the dataset in a backup state. When the primary owner relinquishes ownership, primary ownership is passed to one of the backup systems. A structure castout owner for the entire cache assumes the responsibility of castout of changed data for a dataset for which the primary castout owner has had a failure.

27 Claims, 3 Drawing Sheets

SYSTEM AND METHOD FOR CONTINUOUS DESTAGING OF CHANGED DATA FROM A SHARED CACHE IN A MULTISYSTEM SHARED DISK ENVIRONMENT WHEREIN CASTOUT INTEREST IS ESTABLISHED IN A HIERARCHICAL FASHION

This application is a continuation of application Ser. No. 08/311,755, filed Sep. 23, 1994, now abandoned.

CROSS-REFERENCE TO OTHER APPLICATION(S)

The following application of common assignee is related to the present application, and is believed to have an effective filing date identical with that of the present application:

U.S. patent application entitled System And Method For Including Stored Procedures, User-Defined Functions, And Trigger Processing In An Existing Unit Of Work, by Curt L. Cotner, Robert J. Heaps, Wendy L. Koontz, Benjamin R. Little, and Thomas J. Toomire, Ser. No. 08/311,035 (filed Sep. 23, 1994) incorporated herein by reference in its entirety.

TECHNICAL FIELD

The present invention relates generally to shared disk systems and more particularly to a system and method for continuous destaging of changed data from a shared cache.

BACKGROUND ART

With the advent of shared data systems came the requirement that data updates be propagated to all systems sharing those data. Several techniques have been developed in response to this requirement. One such technique utilizes a high speed electronic cache for propagating data updates among the various systems in the data sharing facility. One example of such a cache is a coupling facility available from International Business Machines, Inc.

In a shared data facility implementing this cache technique, when one system updates data (for example a page of data in a data file), that system forwards the updated data (e.g., the updated page) to the cache. However, due to the high costs typically associated with cache storage, the size of such a cache is much smaller than the capacity of the shared disk(s). Consequently, a process is provided to periodically destage, or cast out changed data from the shared cache. Such a process is commonly known as a castout process. In this environment, the system performing the update sends the updated data (e.g., the page) to the cache. At some later moment, the castout process fetches the updated data from the cache and replaces the corresponding data on the shared disk.

SUMMARY OF THE INVENTION

The present invention is directed to a system and method for distributing the task of destaging, or casting out, changed data in a shared cache. According to the invention, each system that has an update interest in a dataset is capable of acquiring a castout ownership interest in this dataset. Thus, the invention provides for continuous destaging of changed data from the shared cache in the presence of failures of systems using the cache. The destaging of cached data is distributed among the systems for the purpose of load balancing and for backup in the event of a system failure.

A hierarchical structure for castout ownership is provided. The systems using the shared cache for their shared data allocate a piece of the cache referred to as the cache structure. This cache structure is used for caching data for one or more datasets which are shared by multiple systems. One of these systems using the cache structure becomes the "structure owner" and has the responsibility for initiating castouts at the dataset level.

Systems can hold a castout ownership interest in the dataset at one of two levels: primary and backup. At any one time, only one system can hold a primary castout ownership interest; all other systems having castout ownership have such ownership in the backup state.

The first time a system updates a shared dataset, that system attempts to acquire castout ownership. This system is granted primary castout ownership, but only if no other system holds primary castout ownership for that dataset. Otherwise, the system acquires a backup ownership interest in the dataset.

When a system having castout lock in a dataset loses its update interest in that dataset, the system relinquishes castout lock for that dataset. If the system held lock in the backup state, no further action is required. If, however, the system held a primary ownership interest in the dataset, primary ownership must pass to a backup system. If no backup system exists, all changed data from the dataset are castout by the primary system and the castout process for that dataset is folded up before the primary system relinquishes ownership. If one or more backup systems do exist, primary ownership responsibility is passed on to one of these systems.

A structure castout ownership level is provided whereby a system is designated as having castout responsibility for the whole cache structure in the shared cache. The system having castout ownership at the structure level accomplishes its tasks by calling on systems having castout ownership (preferably primary ownership) for the datasets. Periodically, a process within the structure castout owner takes a checkpoint to determine a timestamp for recovery purposes. At checkpoint, the structure castout owner attempts to castout all dirty data for the cache structure used by the system.

In the event of a failure of the primary castout owner for a dataset, the structure castout owner detects the absence of the primary castout owner and assumes the responsibility for casting out changed data of that dataset.

An advantage of the invention is that castout responsibility is distributed among several systems. Thus, bottlenecks caused by an overloaded system can be avoided. A further advantage is that by distributing the castout workload, the impact on transaction processing is minimized and protection is provided against loss of the castout feature.

One object of the invention is to have an uninterrupted service of casting out changed pages from the shared cache regardless of a failure of individual system(s) performing that task.

The foregoing and other objects, features and advantages of the invention will be apparent from the following more particular description of preferred embodiments of the invention, as illustrated in the accompanying drawings.

BRIEF DESCRIPTION OF DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION

The present invention is directed toward a system and method for distributing the castout work of a shared cache process among several systems (e.g., DBMS, or data base management systems) in a shared data facility. This distribution is also used to manage recovery from failed castout processes caused by system failures. According to the invention, when a system is required to update data (such as a page in a dataset), it attempts to become a castout owner for that dataset. As the castout owner, that system contains the castout process for that dataset.

Because multiple systems may wish to update the same dataset, and hence, attempt to become a castout owner, the invention provides for the establishment of a castout owner hierarchy and dynamic assignment of castout ownership within this hierarchy. According to this hierarchy, one system is the primary castout owner for the dataset and all others are backup owners for this dataset. It is the system that is the primary owner that contains the castout process. If the primary owner relinquishes its castout ownership interest, a backup owner is upgraded to the status of a primary owner. If there is no backup owner for that dataset, a cache structure owner eventually assumes the responsibility for casting out changed data for that dataset.

Figure 1:
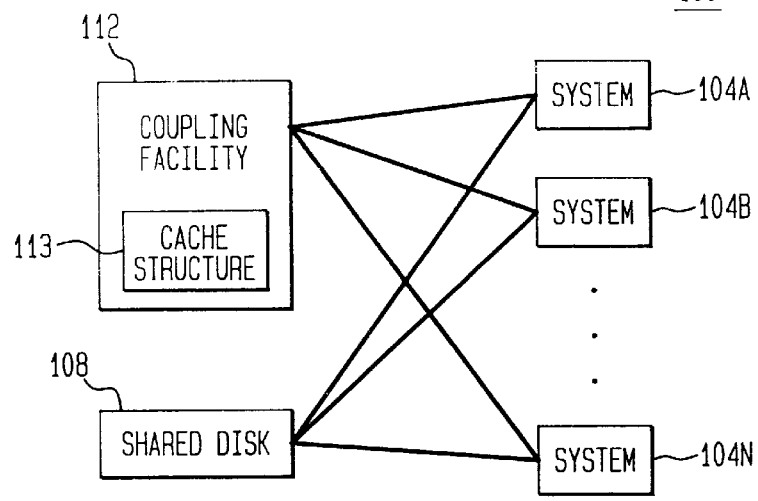
FIG. 1 is a block diagram illustrating a shared data environment.

FIG. 1 is a block diagram illustrating an example of a shared data facility 100 in which the invention can be implemented. According to this example, shared data facility 100 includes several systems 104A–104N (generally referred to as systems 104), a shared disk 108 and a coupling facility 112 which contains a cache structure 113. Systems 104 running application programs share data stored in shared disk 108. Data updates are performed using coupling facility 112. Systems 104 can be collocated in a single location or plant. Alternatively, systems 104 can be located at various different sites physically removed from each other.

In the description provided herein, data updates are discussed in terms of data in data files (or, using IBM terminology, datasets). After reading the description provided herein, it will become apparent to a person skilled in the relevant art how to implement the invention using other data structures and/or formats.

If coupling facility 112 were to be implemented as a write-through cache, data updates would be automatically forwarded to shared disk 108. However, where coupling facility 112 is not a write through facility, the updates of data (e.g., a page) in a dataset are first stored in the cache structure 113. At some later time, the updated data are read by a system 104 and the shared disk 108 version of the data is replaced. Thus, conventional systems assign the castout process to a single system that handles the updates for the entire cache structure 113. There are, however, disadvantages with such a conventional arrangement. First, if the system 104 that contains the castout process goes down or is otherwise unavailable, the castout cannot take place. If the castout feature is lost, data-sharing can potentially be disabled because there is no longer a way to propagate updates across the systems 104. Second, in a data sharing facility 100 handling a high transaction volume, it is important not to overburden any one system 104 with the task of performing castout.

To overcome these drawbacks, the castout workload is distributed among multiple systems 104. By distributing the castout workload, the impact on transaction processing is minimized (i.e., CPU cycles used up by castout), and protection is provided against loss of the castout feature due to a failure on the system 104 that is responsible for castout.

In one embodiment, the services of a lock manager, a commonly available service in transaction processing systems, are utilized to distribute the castout workload among systems 104. Responsibility for the castout of a particular dataset is assigned to a particular system 104. Because each system 104 is susceptible to failure, a scheme is provided whereby the castout responsibility can be transferred to another system 104. According to the invention, castout responsibility is assigned according to the dataset (e.g., file or pageset) update interest. Data in a given dataset are castout by the system 104 that has established itself as the primary castout owner for that dataset. This system can be considered the "owner" of the castout function for that dataset.

Because the castout responsibility is distributed among multiple systems 104, there can be more than one castout owner for the entire collection of files. For each of these datasets, only one system 104 is designated as having primary castout responsibility for each dataset. All other systems 104 (other than primary) having an update interest for a dataset have backup castout responsibility in that dataset.

The first time a system 104, for example system 104A, updates data in a shared dataset, that system 104A attempts to become the castout owner for that dataset. It does so by acquiring a castout lock in the backup state. If no other system 104 is the primary castout owner for that dataset, system 104A acquires primary castout ownership. In this case, system 104A is said to have castout lock in the primary state. If another system 104 already has primary responsibility for that dataset, system 104A acquires backup castout ownership. In this second case, system 104A acquires castout lock in the backup state.

Figure 2:
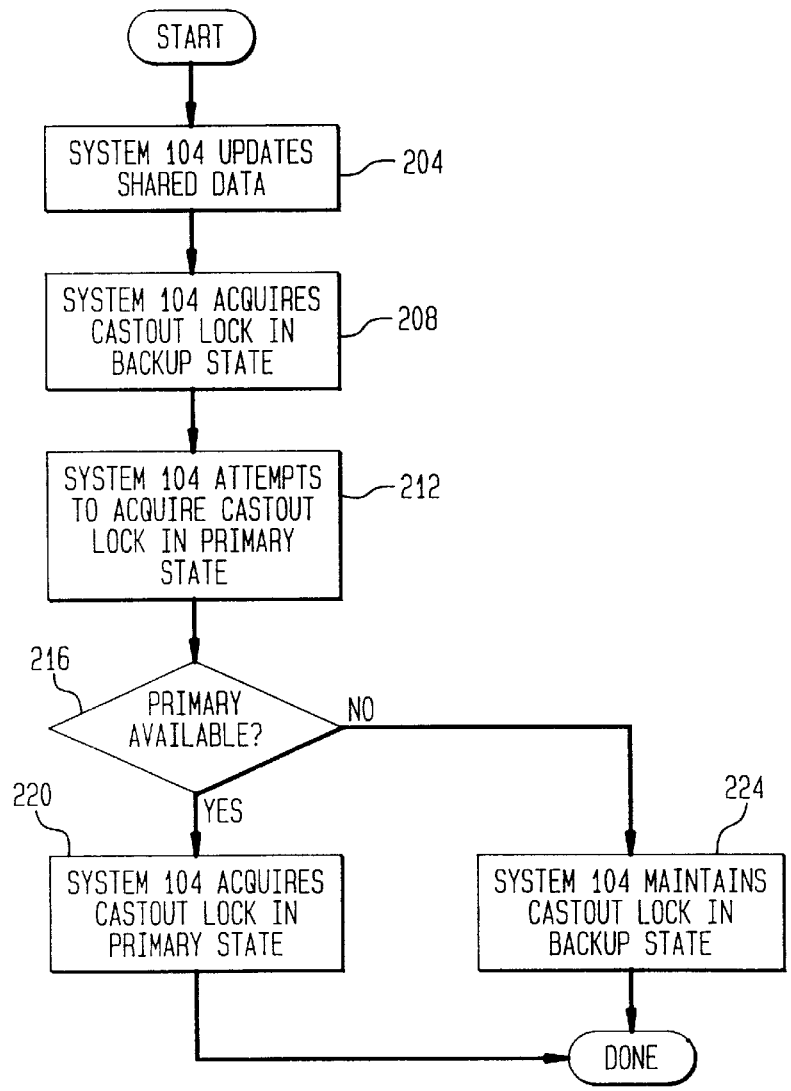
FIG. 2 is an operational flow diagram illustrating a method by which primary or backup castout ownership is established for a dataset.

The process of acquiring castout lock is now described. FIG. 2 is an operational flow diagram illustrating the process of acquiring castout lock. Referring now to FIG. 2, in a step 204, a system 104 (e.g., 104A) opens a dataset for the first update of that dataset and attempts to acquire castout responsibility for that dataset. In a step 208, system 104A acquires castout lock in the backup state for that dataset. Because there can be numerous systems 104 having castout lock in the backup state, such lock is granted in step 208 unconditionally.

In a step 212, system 104A attempts to acquire castout lock in the primary state for the subject dataset. If the primary state is available in step 216 (i.e., if no other system 104 has primary castout ownership for that dataset), system 104A acquires castout lock in the primary state as illustrated by step 220. If, on the other hand, the primary state is not available in step 216, system 104A maintains castout lock in the backup state as illustrated by step 224.

This protocol of first becoming a backup castout owner and then a primary castout owner ensures that each system having an update interest in the dataset can become the primary castout owner for that dataset if no other primary castout owner exists. This is because by first becoming the backup, the system 104 gets on the lock manager's notification list for becoming the primary castout owner in the event the primary castout owner fails or relinquishes its responsibility.

According to one embodiment, a system 104 acquires dataset castout responsibility only if it has an update interest in the dataset, and not if it has read interest only. This protocol is advantageous where a dataset is to be opened in a read/write mode only when a system 104 has an update interest. Thus, a system 104 with a read-only interest would not be a good candidate for writing castout data to the associated dataset on shared disk 108.

When a system 104 having castout lock in a dataset loses its update interest, it relinquishes castout lock. The process of relinquishing castout lock is described with reference to the operational flow diagram depicted in FIG. 3.

Figure 3:
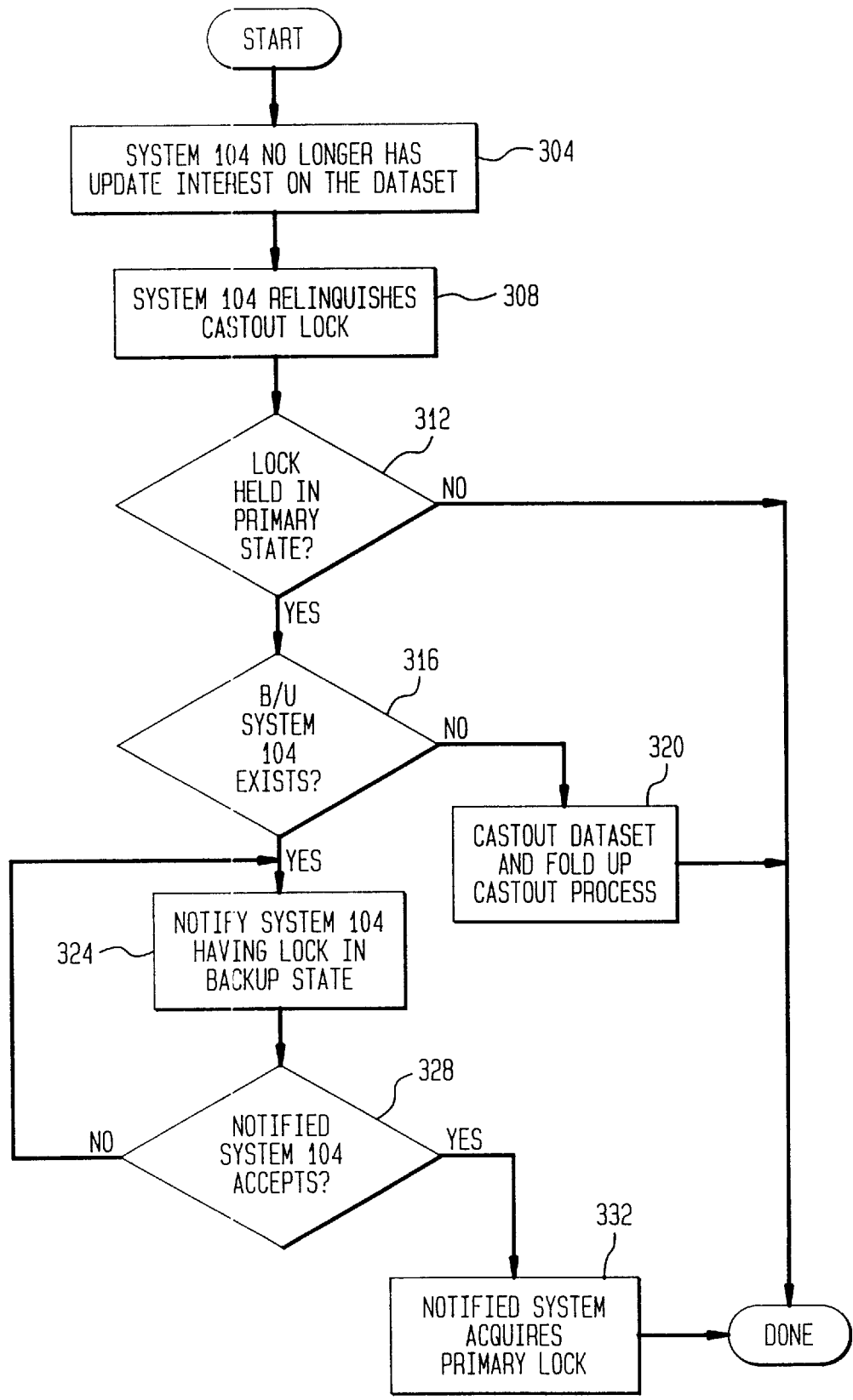
FIG. 3 is an operational flow diagram illustrating a method by which a system can relinquish castout lock on a dataset.

Referring now to FIG. 3, in a step 304, a system 104 having castout lock for a dataset (e.g., system 104A) relinquishes its update interest in that dataset. In a step 308, that system 104A relinquishes castout lock for that dataset. If system 104A held lock in the backup state (decision block 312), no further processing takes place in other instances of systems 104. If, however, system 104A held lock in the primary state (decision block 312), primary ownership must pass to a backup system 104. Thus, when the primary owner relinquishes its interest, the global lock manager informs the primary owner as to the state of the castout lock held by other systems 104 for that dataset. However, if no backup system 104 exists (decision block 316), the dataset is castout by system 104A and the castout process is folded up as illustrated in a step 320.

If a backup system 104 exists, in a step 324 the global lock manager notifies the backup system 104 (e.g., system 104B) that it may now hold lock in the primary state. If the backup system 104B accepts this primary responsibility for the dataset (decision block 328), system 104B becomes the primary owner of the castout responsibility for this dataset as illustrated in a step 332.

Note that system 104B may refuse to accept primary castout responsibility for the dataset as illustrated by decision block 328. This may be because system 104B is overloaded and does not want to accept castout responsibility. However, if system 104B is the only remaining system 104 that holds castout lock for this dataset, it is not allowed to refuse primary castout responsibility.

In one embodiment, some systems may be disabled from having castout responsibility, or even disabled from having primary castout responsibility, due to cost or performance constraints. For example, due to communications costs and bandwidth constraints, it would be costly and/or inefficient to assign primary castout responsibility to a system 104 that is located at a very far distance from the shared disk 112.

In one embodiment, the castout feature of the invention uses a two-level hierarchy of systems 104 that communicate via messages. At the lower level of the hierarchy are systems 104 that are in charge of castouts for datasets. At the higher level is a system 104 that controls castout responsibility for the whole cache structure 113. This system 104 at the higher level is referred to as the structure castout owner. The structure castout owner accomplishes its tasks by calling upon services of systems 104 at the lower level. Structure castout ownership is assigned by acquiring a structure castout lock in the primary state. Backup responsibility is assigned by acquiring structure castout lock in the backup state.

Figure 4:
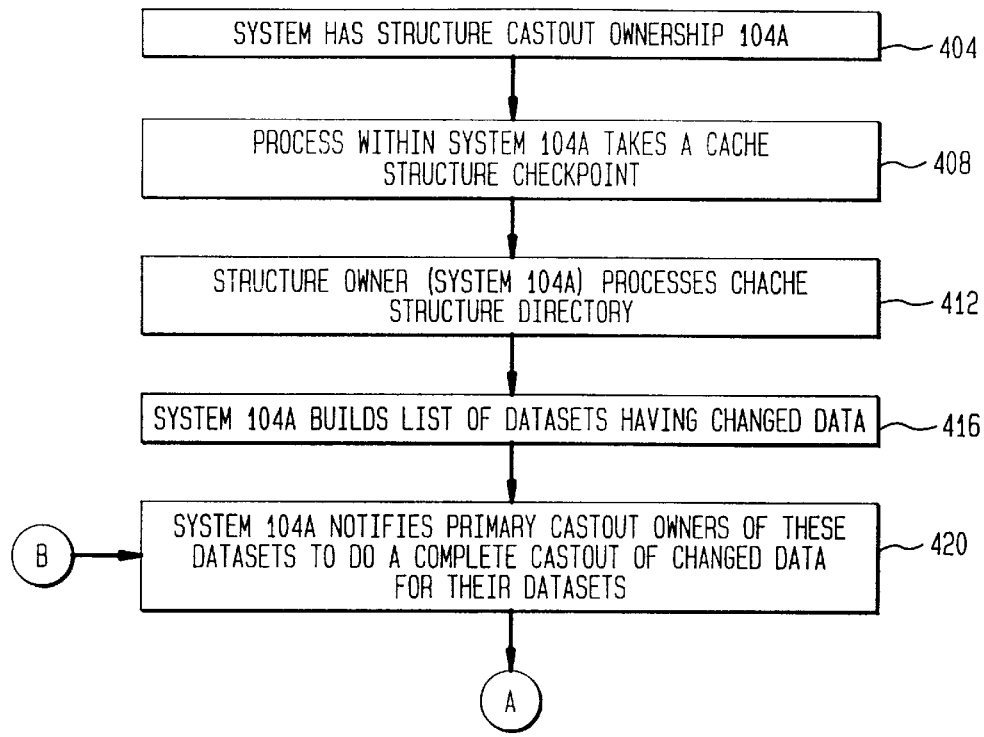
FIG. 4 is an operational flow diagram illustrating a method by which a system manages structure castout.

A method by which the structure castout owner manages cleanup of datasets with changed data is illustrated in FIG. 4. In a step 404, one system (e.g., system 104A) is assigned structure castout ownership in the primary state. Periodically, a process within structure castout owner system 104A takes a cache structure checkpoint. Such a checkpoint is preferably time driven. This is illustrated in step 408. The purpose of this checkpoint is to determine a timestamp for recovery purposes. Also, at the cache structure checkpoint, the system attempts to castout all data for cache structure 113.

At cache structure checkpoint, the structure castout owner system 104A starts processing a cache structure's directory to get a "min" timestamp for recovery purposes. This is illustrated by a step 412. This process is fully described in U.S. Pat. No. 5,280,611, to Mohan, et al, the full disclosure of which is incorporated herein by reference as if reproduced in full below.

While the structure castout owner system 104A scans the coupling facility directory, in a step 416, system 104A builds a list of datasets having updated data in the cache structure 113. In a step 420, the structure castout owner system 104A notifies the respective owner systems 104 of these datasets to castout all updated data for their datasets.

Figure 5:
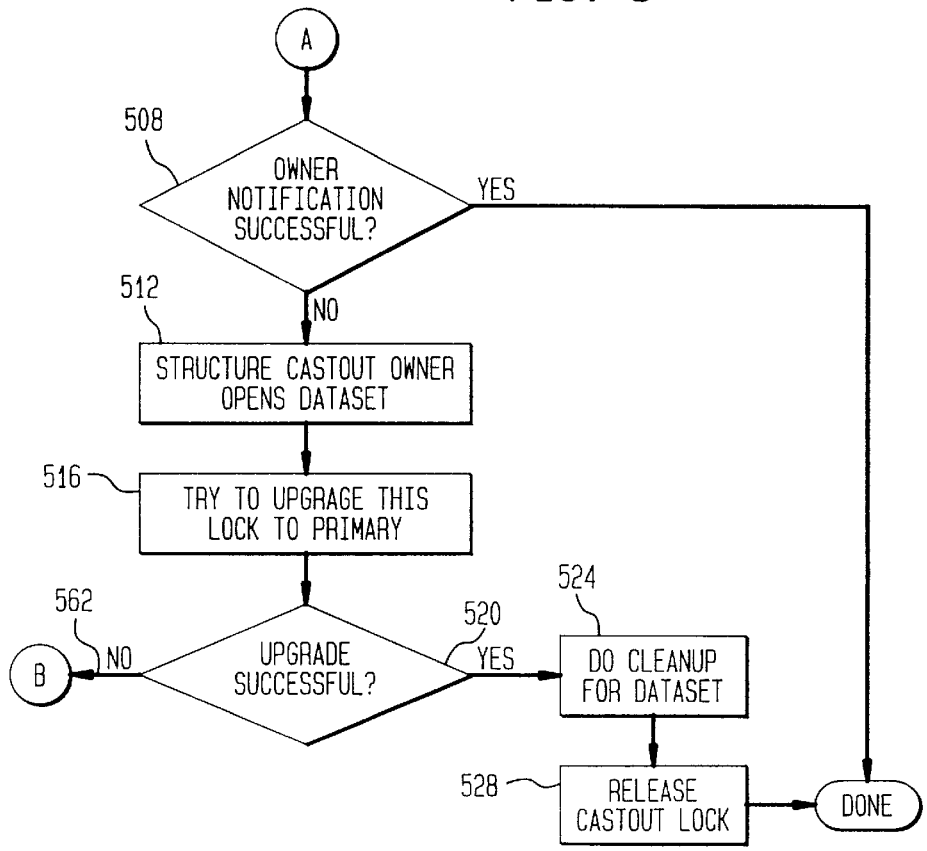
FIG. 5 is an operational flow diagram illustrating a method by which a system having primary structure castout lock acquires castout lock for a dataset.

As stated above, in step 420 the structure castout owner system 104A notifies the primary castout owner of the dataset that there is dirty data. However, if the primary owner system 104A for this dataset has failed and if there is no backup owner, the castout function can only arise at the cache structure checkpoint. When, in step 420, the structure castout owner system 104A determines that there is no primary lock holder for the dataset, system 104A assumes temporary castout ownership for that dataset, casts out the data from the dataset, closes the dataset, and relinquishes the castout responsibility for that dataset. FIG. 5 is an operational flow diagram illustrating the process of assuming temporary castout ownership in greater detail.

As stated above, in step 420 the structure castout owner system 104A notifies the owner system 104 that there is dirty data. More specifically, system 104A notifies the system having lock in the primary state for the specific dataset. If there is a system 104 having lock in the primary state (decision block 508), that system 104 handles the castout for that dataset. If, however, there is no system having lock in the primary state for that dataset, in a step 512, the structure castout owner system 104A physically opens the subject dataset.

In a step 516, the structure castout owner system 104A attempts to acquire castout lock for the dataset in the primary state. If this attempt fails (decision block 520), this indicates that another system has acquired primary lock in the dataset. Therefore, the operation continues at step 420 as illustrated by flowline 562. If, on the other hand, castout owner system 104A acquires castout lock for the dataset in the primary state, in step 524 castout owner system 104A casts out the data. In step 528 castout owner system 104A relinquishes castout lock for the dataset.

Best Mode for Carrying Out the Invention

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A method of distributing a castout process for datasets among a plurality of systems in a shared data environment, wherein each system has a processor and a memory, the method comprising the steps of:

assigning a first system attempting to perform an update of a dataset in a cache shared by said plurality of systems a primary castout interest for said dataset, wherein said first system maintains responsibility for destaging said dataset from said shared cache to a memory shared by said plurality of systems; and assigning any one or more second systems attempting to perform a subsequent update of said dataset in said shared cache a backup castout interest for said dataset, wherein said one or more second systems maintain responsibility for destaging said dataset from said shared cache to said shared memory in the event that said first system fails;

wherein said first system gives said one or more second systems an opportunity to accept or decline said primary castout interest for said dataset and passes said primary castout interest thereto if said one or more second systems accept said primary castout interest for said dataset.

2. A method of distributing a castout process for datasets among a plurality of systems in a shared data environment, wherein each system has a processor and a memory, and wherein the plurality of systems share a high-speed electronic storage and a low-speed direct access storage, the method comprising:

assigning a castout lock for a dataset in a backup state to a first system having an update interest in the dataset, wherein said first system is tasked with casting out an updated version of the dataset from said high-speed electronic storage to said low-speed direct access storage in the event that a system having a castout lock for the dataset in a primary state fails;

assigning a castout lock for the dataset in a primary state to said first system if no other of s aid systems holds castout lock in said primary state, wherein said first system is tasked with casting out an updated version of the dataset from said high-speed electronic storage to said low-speed direct access storage; and wherein a second system having castout lock for the dataset in said backup state is given an opportunity to accept or decline castout lock for the dataset in said primary state if said first system fails; and wherein castout lock for the dataset in said primary state is passed to said second system if said second system accepts castout lock for the dataset in said primary state.

3. The method of claim 2, wherein said step of giving said second system having castout lock for the dataset in said backup state an opportunity to accept or decline castout lock for the dataset in said primary state further comprises:

notifying said second system having castout lock for the dataset in said backup state that castout lock for the dataset in said primary state is available;

passing castout lock for the dataset in said primary state to said notified second system.

4. The method of claim 2, further comprising the step of casting out the dataset and folding the castout process if no system has castout lock for the dataset in said backup state.

5. The method of claim 2, further comprising:

assigning structure castout ownership to a third system;

said assigned third system compiling a list of datasets having dirty data; and said assigned third system notifying owners of said dirty datasets to execute a castout process for the datasets thereof.

6. The method of claim 5, wherein said third system determines a timestamp for recovery.

7. A data processing system for distributing a castout process for datasets among a plurality of computer systems in a shared data environment, wherein each system has a processor and a memory, and wherein the plurality of systems share a high-speed electronic storage and a low-speed direct access storage, comprising:

means for assigning a first system having an update interest in the dataset castout lock for the dataset in a backup state, wherein said first system is tasked with casting out an updated version of the dataset from said high-speed electronic storage to said low-speed direct access storage in the event that a system having a castout lock for the dataset in a primary state fails;

means for assigning said first system castout lock for the dataset in a primary state if no other of said systems holds castout lock in said primary state, wherein said first system is tasked with casting out an updated version of the dataset from said high-speed electronic storage to said low-speed direct access storage; and means for giving a second system having castout lock for the dataset in said backup state an opportunity to accept or decline castout lock for the dataset in said primary state if said first system fails, and passing castout lock for the dataset in said primary state to said second system if said second system accepts castout lock for the dataset in said primary state.

8. The data processing system of claim 7, further comprising:

means for notifying said second system that castout lock in said primary state for said dataset is available; and means for passing said castout lock for said dataset in said primary state to said notified second system.

9. The data processing system of claim 7, further comprising means for casting out the dataset and folding the castout process if no system has said backup interest.

10. The data processing system of claim 7, further comprising:

means for assigning structure castout ownership to one of said first and second systems, comprising:

means for compiling a list of datasets having dirty data; and means for notifying owners of said dirty datasets to execute a castout process for datasets thereof.

11. A computer system comprising:

a plurality of processors;

data storage means common to said processors for storing datasets shared among said plurality of processors;

cache means common to said processors for updating datasets for said plurality of processors;

wherein each said processor having an update interest in a changed dataset has a castout process for transmitting said changed dataset from said cache means to said data storage means and deleting an entry for said dataset from said cache means;

means for assigning a first of said plurality of processors a primary interest in casting out a changed dataset, wherein said first system maintains primary responsibility for performing said castout process;

means for assigning a second of said plurality of processors a backup interest in casting out said changed dataset, wherein said second system is provided primary responsibility for performing said castout process if said first system fails; and means for giving said second of said plurality of processors an opportunity to accept or decline said primary castout interest for said changed dataset and passing said primary castout interest thereto if said second of said plurality of processors accepts said primary castout interest for said changed dataset.

12. A method of distributing a castout process for datasets shared among a plurality of systems in a shared data environment, wherein each system has a processor and a memory, and wherein the plurality of systems share a cache and a secondary memory, the method comprising the steps of:

(a) assigning a first system attempting to update a dataset in said cache a backup castout interest for said dataset, wherein said first system maintains responsibility for destaging said dataset from said cache to said secondary memory in the event that another system having a primary castout interest for said dataset fails; and (b) if no other system has a primary castout interest for said dataset, assigning said first system a primary castout interest, wherein said first system maintains responsibility for destaging said dataset from said cache to said secondary memory, wherein a second system having a backup castout interest for said dataset is given an opportunity to accept or decline said primary castout interest if said first system fails, and wherein said primary castout interest is passed to said second system if said second system accepts said primary castout interest.

13. The method of claim 12, wherein step (b) further comprises:

if said first system has a primary castout interest for said dataset, assigning any one or more systems attempting to update said dataset in said cache a backup castout interest for said dataset, wherein said one or more systems maintain responsibility for destaging said dataset from said cache to said secondary memory if said first system fails.

14. The method of claim 12, wherein said second system must accept primary castout interest from said first system if no other of said one or more systems has a backup castout interest for said dataset.

15. The method of claim 12, wherein if no second system having a backup interest for said dataset exists, performing a castout operation of said dataset from said common cache to said common secondary memory and closing the castout operation process for said dataset.

16. The method of claim 12, further comprising:

assigning a third of said plurality of systems castout ownership for an entire structure containing said dataset and one or more other datasets being updated by a similar castout process.

17. The method of claim 16, wherein said third system:

(a) processes a structure of said cache to obtain a timestamp representing a transaction log sequence for update requests from said systems;

(b) builds a directory of all updated datasets that have not yet been cast out from said cache; and (c) attempts to periodically notify every respective system having primary castout interest for an updated dataset to destage each said updated dataset from said cache to said secondary memory.

18. The method of claim 17, wherein if a said respective system is not notified successfully for an updated dataset, said third system attempts to obtain a primary interest for said updated dataset, wherein said third system is provided responsibility for destaging said updated dataset from said cache to said secondary memory.

19. The method of claim 18, wherein if said third system successfully obtains a primary interest for said updated dataset, said third system destages said updated dataset from said cache to said secondary memory, closes said updated dataset, and relinquishes said primary interest therefrom.

20. A system for distributing a castout process for datasets shared among a plurality of systems in a shared data environment, wherein each system has a processor and a memory, and wherein the plurality of systems share a cache and a secondary memory, comprising:

means for assigning a first system attempting to update a dataset in said cache a backup castout interest for said dataset, wherein said first system maintains responsibility for destaging said dataset from said cache to said secondary memory in the event that another system having a primary castout interest for said dataset fails; and means for assigning said first system a primary castout interest if no other system has a primary castout interest for said dataset, wherein said first system maintains responsibility for destaging said dataset from said cache to said secondary memory;

wherein a second system having a backup castout interest for said dataset is given an opportunity to accept or decline said primary castout interest if said first system fails, and wherein said primary castout interest is passed to said second system if said second system accepts said primary castout interest.

21. The system of claim 20, wherein said means for assigning said first system a primary castout interest further comprises:

means for assigning any one or more systems attempting to update said dataset in said cache a backup castout interest for said dataset if said first system has a primary castout interest for said dataset, wherein said one or more systems maintain responsibility for destaging said dataset from said cache to said secondary memory if said first system fails.

22. The system of claim 20, wherein said second system must accept primary castout interest from said first system if no other of said one or more systems has a backup castout interest for said dataset.

23. The system of claim 20, wherein if no second system having a backup interest for said dataset exists, said first system performs a castout operation of said dataset from said common cache to said common secondary memory and closes the castout operation process for said dataset.

24. The system of claim 20, further comprising:

means for assigning a third of said plurality of systems castout ownership for an entire structure containing said dataset and one or more other datasets being updated by a similar castout process.

25. The system of claim 24, wherein said third system further comprises:

means for processing a structure of said cache to obtain a timestamp representing a transaction log sequence for update requests from said systems;

means for building a directory of all updated datasets that have not yet been cast out from said cache; and means for attempting to periodically notify every respective system having primary castout interest for an updated dataset to destage each said updated dataset from said cache to said secondary memory.

26. The system of claim 25, wherein if a said respective system is not notified successfully for an updated dataset, said third system attempts to obtain a primary interest for said updated dataset, wherein said third system is provided responsibility for destaging said updated dataset from said cache to said secondary memory.

27. The system of claim 26, wherein if said third system successfully obtains a primary interest for said updated dataset, said third system destages said updated dataset from said cache to said secondary memory, closes said updated dataset, and relinquishes said primary interest therefrom.

* * * * *